United States Patent
Yagi et al.

(10) Patent No.: US 11,575,150 B2
(45) Date of Patent: Feb. 7, 2023

(54) LITHIUM ION CONDUCTIVE MATERIAL, ALL-SOLID-STATE SECONDARY BATTERY, AND METHOD OF MANUFACTURING SOLID ELECTROLYTE

(71) Applicant: NGK INSULATORS, LTD., Nagoya (JP)

(72) Inventors: En Yagi, Nagoya (JP); Yosuke Sato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 322 days.

(21) Appl. No.: 16/816,828

(22) Filed: Mar. 12, 2020

(65) Prior Publication Data

US 2020/0303769 A1 Sep. 24, 2020

(30) Foreign Application Priority Data

Mar. 22, 2019 (JP) .............................. JP2019-054767

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
CPC ......... H01M 10/0562; H01M 10/0525; H01M 2300/008
See application file for complete search history.

(56) References Cited

U.S. PATENT DOCUMENTS

2013/0202971 A1  8/2013  Zhao et al.
2019/0245240 A1* 8/2019  Park ...................... C01D 15/00

FOREIGN PATENT DOCUMENTS

WO  WO-2018062770 A1 * 4/2018 ............. C01D 15/00

OTHER PUBLICATIONS

Georg Schwering, et al., "High Lithium Iconic Conductivity in the Lithium Halide Hydrates $Li_{3-n}(OH_n)Cl$ (0.83 ≤n ≤2) and $Li_{3-n}(OH_n)Br$ (1 ≤n <2) at Ambient Temperatures," *CHEMPHYSCHEM*, vol. 4, Apr. 2003, pp. 343-348.
Yutao Li, et al., "Fluorine-Doped Antiperovskite Electrolyte for All-Solid-State Lithium-Ion Batteries," *Angew. Chem. International Edition*, 2016, No. 55, pp. 9965-9968.

* cited by examiner

*Primary Examiner* — Eugenia Wang
(74) *Attorney, Agent, or Firm* — Burr & Brown, PLLC

(57) ABSTRACT

A lithium ion conductive material has a composition formula of $Li_a(OH)_bF_cCl_dBr_{1-d}$, where 1.8≤a≤2.3, b=a −c−1, 0<c≤0.30, 0<d<1, and includes an antiperovskite-type crystal phase. The lithium ion conductive material is manufactured, for example, by heating LiOH, LiF, LiCl, and LiBr at a temperature not lower than 250° C. and not higher than 600° C. for 0.1 hours or more while stirring them at a molar ratio of 1:X:Y:Z (where 0.03≤X≤0.3, 0.2≤Y<1.1, 0<Z<1) under an Ar gas atmosphere.

8 Claims, 2 Drawing Sheets

LITHIUM ION CONDUCTIVE MATERIAL, ALL-SOLID-STATE SECONDARY BATTERY, AND METHOD OF MANUFACTURING SOLID ELECTROLYTE

CROSS REFERENCE TO RELATED APPLICATION

The present application claims priority to Japanese Patent Application No. 2019-054767 filed on Mar. 22, 2019, and the disclosure of JP 2019-054767 is incorporated herein by reference in its entirety.

TECHNICAL FIELD

The present invention relates to a lithium ion conductive material, and the lithium ion conductive material is used for, e.g., an all-solid-state secondary battery.

BACKGROUND ART

Conventionally, lithium batteries have been used for portable devices such as personal computers, cellular phones, or the like. In the lithium battery for these uses, used is a liquid electrolyte in which lithium salt is dissolved in a combustible organic solvent, i.e., an electrolyte solution as a medium for carrying ions. For the battery using the electrolyte solution, it is required to take various measures for preventing a liquid spill of the electrolyte solution, ignition, explosion, or the like. On the other hand, in recent years, attention has been directed to an all-solid-state lithium battery using a solid lithium ion conductive material which makes it possible to easily ensure safety. Since all the elements are solid in the all-solid-state lithium battery, safety measures are easily ensured and problems of performance degradation due to the liquid spill or corrosion are less likely to be caused.

One of the studies on the lithium ion conductive material is, for example, "High Lithium Ionic Conductivity in the Lithium Halide Hydrates $Li_{3-n}(OH_n)Cl$ ($0.83 \leq n \leq 2$) and $Li_{3-n}(OH_n)Br$ ($1 \leq n \leq 2$) at Ambient Temperatures", by Georg Schwering and other three, CHEMPHYSCHEM, April 2003, pp. 343 to 348, published by WILEY-VCH. In this document, experiments are performed on various $Li_{3-n}(OH_n)Cl$ ($0.83 \leq n \leq 2$) and $Li_{3-n}(OH_n)Br$ ($1 \leq n \leq 2$) which are lithium ion conductive materials each having an antiperovskite-type structure and the relation between a temperature and ionic conductivity on each of these materials is reported.

The specification of US Patent Application Publication No. 2013/0202971 describes antiperovskite-type lithium ion conductive materials such as $Li_3OCl$, $Li_3OBr$, or the like. In "Fluorine-Doped Antiperovskite Electrolyte for All-Solid-State Lithium-Ion Batteries", by Yutao Li and other ten, Angewandte Chemie International Edition, 2016, 55, pp. 9965 to 9968, published by WILEY-VCH, the relation between a temperature and lithium ionic conductivity on antiperovskite-type $Li_2(OH)_{0.9}F_{0.1}C$ and $Li_2OHBr$ is reported.

Thus, though studies on various materials have been made as to the lithium ion conductive material having high lithium ionic conductivity, in order to broaden the options of the materials in accordance with various properties required to batteries, it is required to propose many kinds of materials having relatively high lithium ionic conductivity.

SUMMARY OF INVENTION

The present invention is intended for a lithium ion conductive material. The lithium ion conductive material according to the present invention has a composition formula of $Li_a(OH)_bF_cCl_dBr_{1-d}$ (where $1.8 \leq a \leq 2.3$, $b=a-c-1$, $0<c \leq 0.30$, $0<d<1$) and includes an antiperovskite-type crystal phase. Preferably, the composition formula further satisfies $0.02 \leq c \leq 0.20$ and $0.25 \leq d \leq 0.95$.

The lithium ion conductive material has relatively high lithium ionic conductivity even at low temperature. The lithium ion conductive material sometimes further includes a crystal phase of LiF. The lithium ion conductive material has high lithium ionic conductivity at low temperature because the stability of the crystal phase is high and there is no phase transition at low temperature. Further, no phase transition depending on the temperature has an advantageous aspect for a device since there is no volume change of an electrolyte and it is thereby possible to suppress peeling-off or a crack in an electrode interface. In one preferred embodiment, the lithium ion conductive material is a melt-solidified solid.

According to the present invention, it is possible to provide a new lithium ion conductive material having high lithium ionic conductivity.

The present invention is also intended for an all-solid-state secondary battery including the above-described lithium ion conductive material. In one preferred embodiment, a positive electrode of the all-solid-state secondary battery includes a lithium composite oxide, and a negative electrode thereof includes Ti and includes a material in which a lithium ion is insertable and removable at 0.4 V or more with the Li/Li$^+$ equilibrium potential as the reference. The lithium composite oxide preferably has a layered rock salt structure or a spinel structure.

The present invention is still also intended for a method of manufacturing a solid electrolyte. In the method of manufacturing a solid electrolyte, LiOH, LiF, LiCl, and LiBr are heated at a temperature not lower than 250° C. and not higher than 600° C. for 0.1 hours or more while being stirred at a molar ratio of 1:X:Y:Z (where $0.03 \leq X \leq 0.3$, $0.2 \leq Y < 1.1$, $0 < Z < 1$) under an Ar gas atmosphere.

These and other objects, features, aspects and advantages of the present invention will become more apparent from the following detailed description of the present invention when taken in conjunction with the accompanying drawings.

DESCRIPTION OF EMBODIMENTS

Figure 1:
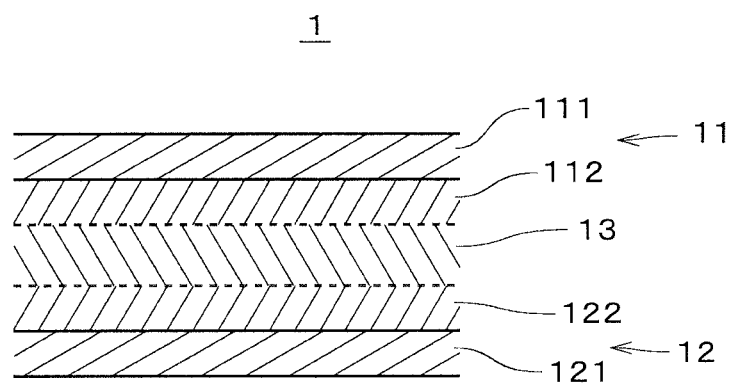
FIG. 1 is a longitudinal section showing an all-solid-state secondary battery.

FIG. 1 is a longitudinal section showing an all-solid-state secondary battery 1 in accordance with one preferable preferred embodiment of the present invention. The all-solid-state secondary battery 1 has a positive electrode 11, a lithium ion conductive material layer 13 which is a solid electrolyte or includes a solid electrolyte, and a negative electrode 12 in this order from the upper side. Specifically, the lithium ion conductive material layer 13 is positioned between the positive electrode 11 and the negative electrode 12. A lithium ion conductive material which forms the lithium ion conductive material layer 13 is preferably a melt-solidified solid. The positive electrode 11 includes a current collector 111 and a positive electrode layer 112. The positive electrode layer 112 includes a positive electrode active material. The negative electrode 12 includes a current collector 121 and a negative electrode layer 122. The negative electrode layer 122 includes a negative electrode active material.

The positive electrode active material of the positive electrode layer 112 preferably includes a lithium composite oxide. The lithium composite oxide is an oxide represented by $Li_xMO_2$ (0.05<x<1.30, M is at least one kind of transition metal and M is typically includes at least one kind of element selected from a group of Co, Ni, Mn, and Al). The lithium composite oxide preferably has a layered rock salt structure or a spinel structure. Further, the lithium composite oxide is preferably a sintered body.

Examples of the lithium composite oxide having the layered rock salt structure are $Li_xCoO_2$ (lithium cobalt oxide), $Li_xNiO_2$ (lithium nickel oxide), $Li_xMnO_2$ (lithium manganese oxide), $Li_xNiMnO_2$ (lithium nickel manganese oxide), $Li_xNiCoO_2$ (lithium nickel cobalt oxide), $Li_xCoNiMnO_2$ (lithium cobalt nickel manganese oxide), $Li_xCoMnO_2$ (lithium cobalt manganese oxide), $Li_2MnO_3$, solid solutions of the above-described compounds, and the like. Particularly preferable examples are $Li_xCoNiMnO_2$ (lithium cobalt nickel manganese oxide) and $Li_xCoO_2$ (lithium cobalt oxide, and typically $LiCoO_2$). Examples of the lithium composite oxide having the spinel structure are $LiMn_2O_4$-based material, $LiNi_{0.5}Mn_{1.5}O_4$-based material, and the like.

The lithium composite oxide may include one or more elements selected from Mg, Al, Si, Ca, Ti, V, Cr, Fe, Cu, Zn, Ga, Ge, Sr, Y, Zr, Nb, Mo, Ag, Sn, Sb, Te, Ba, Bi, and W. Further, $LiMPO_4$ (in this composition formula, M is at least one kind of element selected from Fe, Co, Mn, and Ni) having an olivine structure or the like can be preferably used.

The negative electrode layer 122 includes Ti and includes a material in which a lithium ion is insertable and removable at 0.4 V or more with the $Li/Li^+$ equilibrium potential as the reference. In other words, the lithium ion is insertable and removable at a potential higher than the $Li/Li^+$ equilibrium potential by 0.4 V or more. The negative electrode active material preferably includes above-described Ti, and is more preferably an oxide containing Ti. Preferable examples of such a negative electrode active material are $Li_4Ti_5O_{12}$ (lithium titanate, hereinafter, referred to as "LTO"), $Nb_2TiO_7$ (niobium titanium composite oxide), and $TiO_2$ (titanium oxide), more preferably LTO and $Nb_2TiO_7$, and further preferably LTO. Further, though LTO is known as a compound typically having the spinel structure, LTO may have any other structure during charging and discharging. For example, the reaction of LTO proceeds in two-phase coexistence of $Li_4Ti_5O_{12}$ (having the spinel structure) and $Li_7Ti_5O_{12}$ (having the rock salt structure) during charging and discharging. Therefore, LTO is not limited to the spinel structure. Further, the oxide containing Ti is preferably a sintered body.

The respective compositions and materials of the positive electrode 11 and the negative electrode 12 in the all-solid-state secondary battery 1 are not limited to those described above, but other various compositions and materials may be adopted.

In an exemplary manufacture of the all-solid-state secondary battery 1, prepared are the positive electrode 11 obtained by forming the current collector 111 on the positive electrode layer 112 and the negative electrode 12 obtained by forming the current collector 121 on the negative electrode layer 122. Then, while the positive electrode layer 112 and the negative electrode layer 122 face the lithium ion conductive material, the lithium ion conductive material is sandwiched between the positive electrode 11 and the negative electrode 12 and pressurized, heated, or the like, and the lithium ion conductive material thereby becomes the lithium ion conductive material layer 13 and thus the all-solid-state secondary battery 1 is manufactured. The positive electrode 11, the lithium ion conductive material layer 13, and the negative electrode 12 may be connected by any other method. Further, the lithium ion conductive material layer 13 may be formed by adding another material to the lithium ion conductive material. In other words, the lithium ion conductive material layer 13 is a layer including the lithium ion conductive material.

Each structure of the positive electrode layer and the negative electrode layer may be a form of a generally-termed composite electrode which is obtained by mixing a positive or negative electrode active material, an electro-conductive aid, the lithium ion conductive material, a binder, and the like and molding, or may be a form of a sintered plate which is obtained by sintering positive electrode or negative electrode raw material powder. The sintered plate may have a dense body or a porous body, and may include the lithium ion conductive material inside the pores thereof.

Next, Experimental Examples on the lithium ion conductive material will be described.

Experimental Example 1

As raw materials, prepared are LiBr (having a purity of 99.9% or more), LiOH (having a purity of 98.0% or more), and LiF (having a purity of 99.9% or more) which are commercially available. In a glove box under an Ar gas atmosphere whose dew point temperature is −50° C. or lower, these raw materials are weighed and mixed so that LiBr:LiOH:LiF should be 1.0:0.9:0.1 (molar ratio). The mixed powder obtained thus is put into an alumina crucible (having a purity of 99.7%) and then into a quartz tube, and the quartz tube is sealed by a flange.

This quartz tube is set in a tube furnace, and a heat treatment is performed at 350° C. for 30 minutes while Ar gas whose dew point temperature is −50° C. or lower is carried from a gas introduction port of the flange and exhausted from a gas exhaust port and the mixed powder is stirred. After cooling, the crucible is taken out in the glove box under the Ar gas atmosphere whose dew point temperature is −50° C. or lower. The compound is taken out from the crucible and ground in a mortar, and powder of the lithium ion conductive material is thereby obtained.

Further, the heating temperature and the heating time under the Ar gas atmosphere may be changed as appropriate, and generally the heating temperature has only to be not lower than 250° C. and not higher than 600° C. and the heating time has only to be 0.1 hours or more.

Experimental Example 2

As the raw materials, prepared are LiCl (having a purity of 99.9% or more), LiOH (having a purity of 98.0% or more), and LiF (having a purity of 99.9% or more) which are commercially available. These raw materials are weighed so that LiCl:LiOH:LiF should be 1.0:0.9:0.1 (molar ratio), and the same processing as performed in Experimental Example 1 is performed, to thereby obtain the powder of the lithium ion conductive material.

Experimental Example 3

As the raw materials, prepared are LiCl (having a purity of 99.9% or more), LiBr (having a purity of 99.9% or more), LiOH (having a purity of 98.0% or more), and LiF (having a purity of 99.9% or more) which are commercially available. These raw materials are weighed so that LiCl:LiBr:LiOH:LiF should be 0.25:0.75:0.9:0.1 (molar ratio), and the same processing as performed in Experimental Example 1 is performed, to thereby obtain the powder of the lithium ion conductive material.

Experimental Example 4

The same processing as performed in Experimental Example 1 is performed, except that these raw materials are weighed so that LiCl:LiBr:LiOH:LiF should be 0.50:0.50: 0.9:0.1 (molar ratio), to thereby obtain the powder of the lithium ion conductive material.

Experimental Example 5

The same processing as performed in Experimental Example 1 is performed, except that these raw materials are weighed so that LiC:LiBr:LiOH:LiF should be 0.75:0.25: 0.9:0.1 (molar ratio), to thereby obtain the powder of the lithium ion conductive material.

Experimental Example 6

The same processing as performed in Experimental Example 1 is performed, except that these raw materials are weighed so that LiCl:LiBr:LiOH:LiF should be 0.90:0.10: 0.9:0.1 (molar ratio), to thereby obtain the powder of the lithium ion conductive material.

Experimental Example 7

The same processing as performed in Experimental Example 1 is performed, except that these raw materials are weighed so that LiCl:LiBr:LiOH:LiF should be 0.75:0.25: 0.8:0.2 (molar ratio), to thereby obtain the powder of the lithium ion conductive material.

Experimental Example 8

The same processing as performed in Experimental Example 1 is performed, except that these raw materials are weighed so that LiCl:LiBr:LiOH:LiF should be 0.75:0.25: 0.7:0.3 (molar ratio), to thereby obtain the powder of the lithium ion conductive material.

Experimental Example 9

The same processing as performed in Experimental Example 1 is performed, except that these raw materials are weighed so that LiCl:LiBr:LiOH:LiF should be 0.75:0.25: 0.95:0.05 (molar ratio), to thereby obtain the powder of the lithium ion conductive material.

The raw material ratio and the synthesis condition in above-described Experimental Examples are shown in Table 1. In Table 1, Experimental Examples 3 to 7 and 9 with the mark "*" are embodiments of the present invention and Experimental Examples 1, 2, and 8 are comparative examples.

TABLE 1

| Experimental Example | Raw Material Ratio | | | | | | | Synthesis Conditions | |
|---|---|---|---|---|---|---|---|---|---|
| | mol LiOH | mol LiF | mol LiCl | mol LiBr | X | Y | Z | ° C. Temp. | hr Time |
| 1 | 0.9 | 0.1 | 0 | 1.0 | 0.11 | 0.00 | 1.11 | 350 | 0.5 |
| 2 | 0.9 | 0.1 | 1.0 | 0 | 0.11 | 1.11 | 0.00 | 350 | 0.5 |
| *3 | 0.9 | 0.1 | 0.25 | 0.75 | 0.11 | 0.28 | 0.83 | 350 | 0.5 |
| *4 | 0.9 | 0.1 | 0.50 | 0.50 | 0.11 | 0.56 | 0.56 | 350 | 0.5 |
| *5 | 0.9 | 0.1 | 0.75 | 0.25 | 0.11 | 0.83 | 0.28 | 350 | 0.5 |
| *6 | 0.9 | 0.1 | 0.90 | 0.10 | 0.11 | 1.00 | 0.11 | 350 | 0.5 |
| *7 | 0.8 | 0.2 | 0.75 | 0.25 | 0.25 | 0.94 | 0.31 | 350 | 0.5 |
| 8 | 0.7 | 0.3 | 0.75 | 0.25 | 0.43 | 1.07 | 0.36 | 350 | 0.5 |
| *9 | 0.95 | 0.05 | 0.75 | 0.25 | 0.05 | 0.79 | 0.26 | 350 | 0.5 |

<Composition Analysis>

A composition analysis is performed on the powder of the lithium ion conductive material obtained in each of above-described Experimental Examples. A quantitative analysis is performed by the calibration curve method, specifically, by using ion chromatography (IC) on F, Cl, and Br which are halogens and using ICP (inductively coupled plasma) atomic emission spectroscopy (ICP-AES) on Li. As to the OH group which cannot be directly analyzed, the molar amounts of F, Cl, Br, and Li are calculated from respective analysis values of them, the numbers of moles of them expressed to two decimal places are multiplied by respective valencies assuming that F has a valency of −1, Cl has a valency of −1, Br has a valency of −1, and Li has a valency of +1, and the number of moles of OH is calculated so that the total of electric charges respectively multiplied by the numbers of moles of F, Cl, Br, Li, and OH should be 0.00 assuming that OH has a valency of −1.

<Measurement of Lithium Ionic Conductivity>

In order to measure the lithium ionic conductivity of the lithium ion conductive material which is obtained in each of above-described Experimental Examples, a SUS cell is manufactured. First, 0.05 g of ceramic spacer is mixed into 1 g of the powder of the lithium ion conductive material and this is mixed lightly in a mortar. Then, 0.02 g of the powder of the lithium ion conductive material with the ceramic spacer mixed therein which is obtained thus is so laid down as to be spread entirely on a stainless steel plate having a diameter of 15.5 mm and a thickness of 0.3 mm, which has been subjected to Au sputtering of 500 angstrom (A). Further, on the powder of the lithium ion conductive material, another stainless steel plate having a diameter of 15.5 mm and a thickness of 0.3 mm, which has been subjected to Au sputtering of 500 angstrom, is placed so that an Au sputtered surface thereof should be in contact with the powder of the lithium ion conductive material, to thereby form a layered body, and a weight is placed thereon.

The layered body is put into an electric furnace in the glove box, and a heat treatment is performed at 400° C. for 45 minutes, to thereby melt the powder of the lithium ion conductive material. Then, the molten lithium ion conductive material is cooled at 100° C./h, to thereby form the lithium ion conductive material layer, and the SUS cell is thereby obtained. The lithium ion conductive material layer is formed of the lithium ion conductive material which is a melt-solidified solid. When the thickness of the SUS cell is measured and the sum of the thicknesses of the upper and lower stainless steel plates each having a thickness of 0.3 mm and the Au sputtering thickness is subtracted from the thickness of the SUS cell, the thickness of the lithium ion conductive material layer in each of Experimental Examples is calculated to be 30 μm.

The lithium ionic conductivity of the SUS cell is measured by the AC (alternating current) impedance measurement in a range from 0.3 MHz to 0.1 Hz. The AC impedance measurement is performed with measuring terminals connected to respective surfaces of the two SUS plates which are surfaces of opposite side to the lithium ion conductive material layer. The above measurement is performed at 25° C. and 0° C. The measurement at 0° C., however, is performed in only some of Experimental Examples.

<Crystal Structure Analysis>

A crystal structure analysis is performed on the powder of the lithium ion conductive material obtained in each of above-described Experimental Examples. For the crystal structure analysis, used is BL5S2 (powder diffraction beam line) of the Debye-Scherrer diffractometer. The wavelength of the X-ray is 0.7 angstrom, the detector used herein is quadruple of two-dimensional semiconductor detectors (PILATUS 100K), and the sample is encapsulated in a capillary inside the glove box under an inert atmosphere.

The measurement at low temperature is performed at each temperature while the temperature is sequentially changed from 25° C. to 0° C., −20° C., −50° C., 0° C., and 25° C. The measurement is performed after keeping for 5 minutes since the temperature reaches each of the above temperatures. The measurement at high temperature is performed at each temperature while the temperature is sequentially changed from 25° C. to 50° C., 100° C., 150° C., 200° C., 100° C., and 25° C. The measurement is performed after keeping for 5 minutes since the temperature reaches each of the above temperatures.

<Evaluation>

Table 2 shows results of the composition analysis, the measurement of the lithium ionic conductivity, and the crystal structure analysis in each of above-described Experimental Examples. Further, the lithium ionic conductivity is expressed as a relative value to the lithium ionic conductivity in Experimental Example 1 (comparative example) assumed to be 1.0. All Experimental Examples are performed by the same operator under the same conditions, to thereby remove any effect due to the difference in the person or place as much as possible.

TABLE 2

| Experimental Example | Composition Analysis $Li_a(OH)_bF_cCl_dBr_{1-d}$ | | | | Conductivity Relative Value When Value in Experimental Example 1 = 1.0 | | Crystal Phase at 0° C. | |
|---|---|---|---|---|---|---|---|---|
| | a | b = a − c − 1 | c | d | 25° C. | 0° C. | Antiperovskite | LiF |
| 1 | 2.0 | 0.90 | 0.10 | 0.00 | 1.0 | 1.0 | Cubic | Not exist |
| 2 | 2.0 | 0.90 | 0.10 | 1.00 | 4.0 | 0.05 | Orthorhombic | Exist |
| *3 | 2.0 | 0.91 | 0.09 | 0.26 | 1.2 | — | Cubic | Not exist |
| *4 | 2.0 | 0.90 | 0.10 | 0.52 | 1.8 | — | Cubic | Exist |
| *5 | 2.0 | 0.89 | 0.11 | 0.75 | 2.0 | 1.9 | Cubic | Exist |
| *6 | 2.0 | 0.91 | 0.09 | 0.91 | 2.9 | — | Cubic | Exist |
| *7 | 2.0 | 0.81 | 0.19 | 0.77 | 1.5 | — | Cubic | Exist |
| 8 | 2.0 | 0.69 | 0.31 | 0.74 | 0.7 | — | Cubic | Exist |
| *9 | 2.0 | 0.95 | 0.05 | 0.76 | 1.8 | — | Cubic | Not exist |

Herein, the composition formula of the lithium ion conductive material is expressed as $Li_a(OH)_bF_cCl_dBr_{1-d}$, where b=a−c−1 and the value of "a" is not less than 1.8 and not more than 2.3 depending on variations in the weighing process or the analysis process.

In Table 2, though the measurement of the lithium ionic conductivity at 0° C. is performed only in Experimental Examples 1, 2, and 5, it is proved that the lithium ionic conductivity is high when the material has an antiperovskite-type cubic crystal and low when the material has an orthorhombic crystal. Since the crystal phase at 0° C. in Experimental Examples 3, 4, and 6 to 9 is cubic, it is thought that the lithium ionic conductivity is high at 0° C. also in these Experimental Examples like in Experimental Example 5. Further, the word "antiperovskite-type" means that "the material has an antiperovskite-type crystal structure". The lithium ion conductive material does not need to have only the antiperovskite-type crystal phase but has only to include the antiperovskite-type crystal phase.

Figure 2:
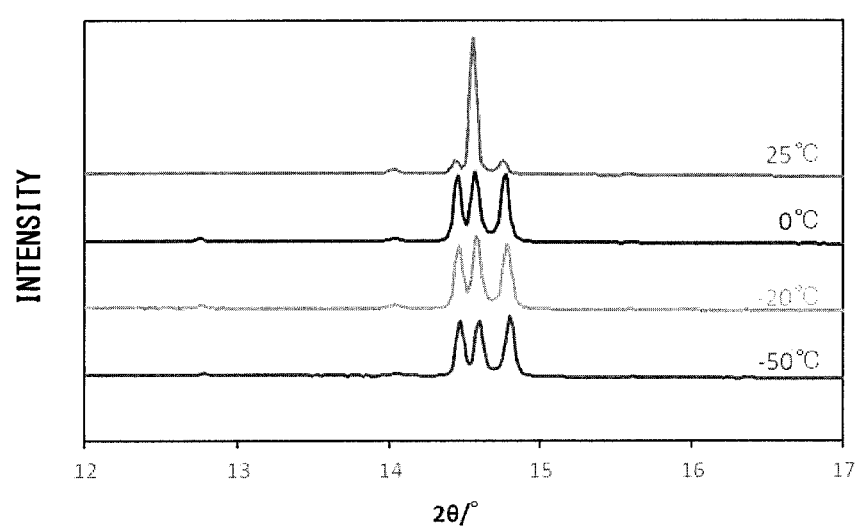
FIG. 2 is a graph showing exemplary X-ray diffraction spectra of a lithium ion conductive material in accordance with Experimental Example 2 (comparative example)
Figure 3:
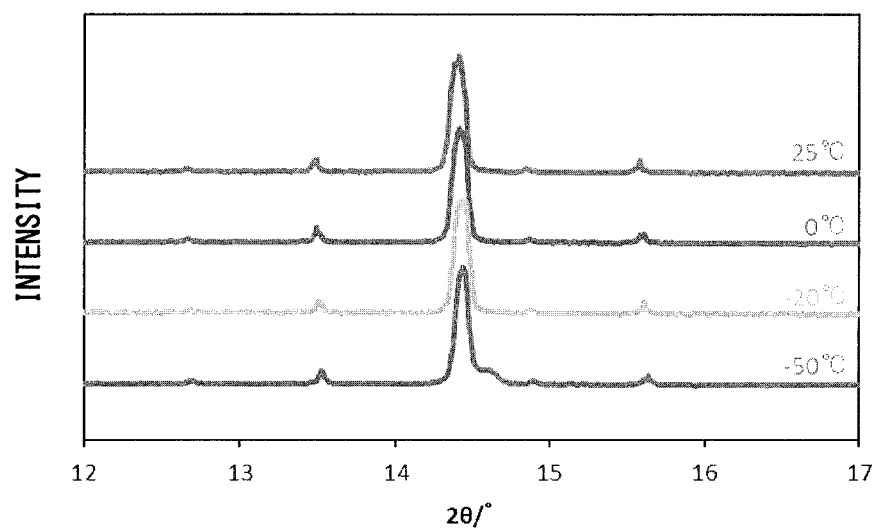
FIG. 3 is a graph showing exemplary X-ray diffraction spectra of a lithium ion conductive material in accordance with Experimental Example 5.

For reference purposes, FIG. 2 shows an X-ray diffraction spectrum at each temperature in Experimental Example 2, and FIG. 3 shows an X-ray diffraction spectrum at each temperature in Experimental Example 5. In FIGS. 2 and 3, a base line of the spectrum is shifted for each temperature. In FIG. 2, the crystal phase is cubic at 25° C., and at 0° C. or lower, phase transition occurs and the crystal phase becomes orthorhombic. In FIG. 3, the crystal phase is kept cubic even at −50° C.

Herein, as a result of the composition analysis, by the comparison between Experimental Example 1 (comparative example) where there is no Cl and Experimental Examples 3 to 7 and 9, it is found that when there is Cl even just a little bit, instead of Br in Experimental Example 1, the lithium ionic conductivity is increased. On the other hand, in Experimental Example 2 (comparative example) where there is no Br, the lithium ionic conductivity at 25° C. is high but the lithium ionic conductivity at 0° C. is low since the crystal phase becomes orthorhombic. Therefore, it can be seen that when there are Cl and Br, relatively high lithium ionic conductivity can be ensured at both 25° C. and 0° C. Particularly, from Experimental Example 6 where Br and Cl are present at a molar ratio of 1:9 (d=0.91), the above-described effect can be produced if Br is even slightly contained. Further, since high lithium ionic conductivity can be achieved also in Experimental Example 3, it is preferable that 0<d<1 in the above-described composition formula. More preferably $0.5 \leq d \leq 0.95$ from the respective results of Experimental Examples 3 to 7 and 9, and further preferably $0.75 \leq d \leq 0.91$.

It is thought that the value of c is preferably $0 < c \leq 0.30$, more preferably $0.02 \leq c \leq 0.20$, and still more preferably $0.05 \leq c \leq 0.20$ from the respective results of Experimental Examples 3 to 7 and 9. When a, b, c, and d satisfy the above-described conditions, it is possible to achieve a new lithium ion conductive material having relatively high lithium ionic conductivity not only at room temperature but also at low temperature.

Further, from above-described Experimental Examples, it is thought that when the molar ratio of LiCl, LiBr, LiOH, and LiF which are the raw materials is 1:X:Y:Z where $0.03 \leq X \leq 0.3$, $0.2 \leq Y < 1.1$, $0 < Z < 1$, it is possible to achieve a new lithium ion conductive material having relatively high lithium ionic conductivity not only at room temperature but also at low temperature. By including LiBr even just a little bit in the raw materials, it is possible to increase the temperature stability of the crystal phase and prevent reduction in the conductivity due to the phase transition at low temperature. Further, as shown in the last column of Table 2, though excess LiF remains depending on the mixing ratio of the raw materials, this does not produce a great effect on the lithium ionic conductivity. In this case, the lithium ion conductive material includes a crystal phase of LiF.

The above-described lithium ion conductive material, all-solid-state secondary battery, and manufacturing method thereof are not limited to those described above but may be modified in various manners.

For example, the lithium ion conductive material may be used for any use other than the all-solid-state secondary battery. The manufacturing condition of the lithium ion conductive material may be changed as appropriate. Further, the raw materials used for manufacturing the lithium ion conductive material may include any other material.

As described earlier, the composition and the manufacturing method of the all-solid-state secondary battery 1 may be changed as appropriate. The positive electrode 11 and the negative electrode 12 described above are each only one example. In the all-solid-state secondary battery 1, instead of individually manufacturing the positive electrode 11 and the negative electrode 12 in advance, heating and pressurizing may be performed in a state where the current collector 111, the positive electrode layer 112, the lithium ion conductive material layer, the negative electrode layer 122, and the current collector 121 are layered.

Even when a pressure treatment is performed while using a plate of positive electrode layer, e.g., a sintered plate of lithium cobalt oxide instead of one stainless steel plate and a plate of negative electrode layer, e.g., a sintered plate including Ti, in which a lithium ion is insertable and removable at 0.4 V or more with the Li/Li$^+$ equilibrium potential as the reference instead of the other stainless steel plate in the manufacture of the above-described SUS cell, the all-solid-state secondary battery can be manufactured. Actually, when a cell is manufactured by using such a manufacturing method as above, a current collector is formed on a surface of each of the positive electrode plate and the negative electrode plate, which is a surface of opposite side to the lithium ion conductive material layer, and this is left stationarily under the condition of the temperature of 150° C. and then a charge/discharge operation is performed, a battery operation can be achieved.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 All-solid-state secondary battery
11 Positive electrode
12 Negative electrode
13 Lithium ion conductive material layer

The invention claimed is:

1. A lithium ion conductive material, having a composition formula of $Li_a(OH)_bF_cCl_dBr_{1-d}$, where $1.8 \leq a \leq 2.3$, $b = a - c - 1$, $0 < c \leq 0.30$, $0 < d < 1$, and including an antiperovskite crystal phase and further including a crystal phase of LiF.

2. The lithium ion conductive material according to claim 1, wherein the composition formula further satisfies $0.02 \leq c \leq 0.20$ and $0.25 \leq d \leq 0.95$.

3. The lithium ion conductive material according to claim 1, being a melt-solidified solid.

4. An all-solid-state secondary battery, comprising:
a positive electrode;
a negative electrode; and
a lithium ion conductive material layer which is positioned between said positive electrode and said negative electrode and includes a lithium ion conductive material according to claim 1.

5. The all-solid-state secondary battery according to claim 4, wherein
said positive electrode includes a lithium composite oxide, and
said negative electrode includes Ti, and includes a material in which a lithium ion is insertable and removable at 0.4 V or more with the Li/Li$^+$ equilibrium potential as the reference.

6. The all-solid-state secondary battery according to claim 5, wherein
said lithium composite oxide has a layered rock salt structure or a spinel structure.

7. The lithium ion conductive material according to claim 1, wherein the composition formula further satisfies $0.75 \leq d \leq 0.95$.

8. A method of manufacturing a solid electrolyte, wherein LiOH, LiF, LiCl, and LiBr are heated at a temperature not lower than 250° C. and not higher than 600° C. for 0.1 hours or more while being stirred at a molar ratio of 1:X:Y:Z where $0.03 \leq X \leq 0.3$, $0.2 \leq Y < 1.1$, $0 < Z < 1$ under an Ar gas atmosphere, wherein the solid electrolyte is a lithium ion conductive material having a composition formula of $Li_a(OH)_b F_c Cl_d Br_{1-d}$, where $1.8 \leq a \leq 2.3$, $b=a-c-1$, $0<c \leq 0.30$, $0<d<1$, and including an antiperovskite crystal phase and further including a crystal phase of LiF.

* * * * *